United States Patent [19]

Davis

[11] Patent Number: 5,771,777
[45] Date of Patent: Jun. 30, 1998

[54] DISPOSABLE BEVERAGE MAKER

[76] Inventor: George T. Davis, P.O. Box 8542, Mission Hills, Calif. 91346

[21] Appl. No.: 796,345

[22] Filed: Feb. 7, 1997

Related U.S. Application Data

[60] Provisional application No. 60/011,417 Feb. 9, 1996.

[51] Int. Cl.⁶ ................................................... A47J 31/00
[52] U.S. Cl. ................................. 99/323; 99/279; 99/304
[58] Field of Search ............................ 99/279, 295, 323, 99/304

[56] References Cited

U.S. PATENT DOCUMENTS

| 4,560,475 | 12/1985 | Kataoka | 99/323 X |
| 4,688,479 | 8/1987 | Cunningham | 99/323 X |

*Primary Examiner*—Reginald L. Alexander
*Attorney, Agent, or Firm*—Albert O. Cota

[57] ABSTRACT

A disposable beverage maker (10) made from a single sheet of flat, insoluble cardboard or plastic in various sizes. The size depends on whether the beverage maker (10) is to be inserted into a container (110) consisting of a cup, mug or a decanter. The cardboard consists of a lower base (12) having four scored sides. on two of the size is respectively located a first side wall (22) and a second side wall (28); on the adjoining sides is respectively located a first stabilizing flap (84) and a second stabilizing flap (92). From the first side wall (22) extends a first handle (34) and from the second side wall extends a second handle (60). When each of the two handles are joined at their outward sections (42,54) and (68,80), the disposable beverage maker (10) is fully assembled and is inserted into the container (110). Thereafter, a coffee filter (112) is placed into the beverage maker (10) and a quantity of coffee grounds (114) or tea is placed into the coffee filter (112). When hot water (116) is poured into the filter (112) the water (116) interacts with the coffee grounds (114) to allow the resulting coffee liquid to flow through an elongated slot (100) located on the lower base (12) and into the container (110).

19 Claims, 3 Drawing Sheets

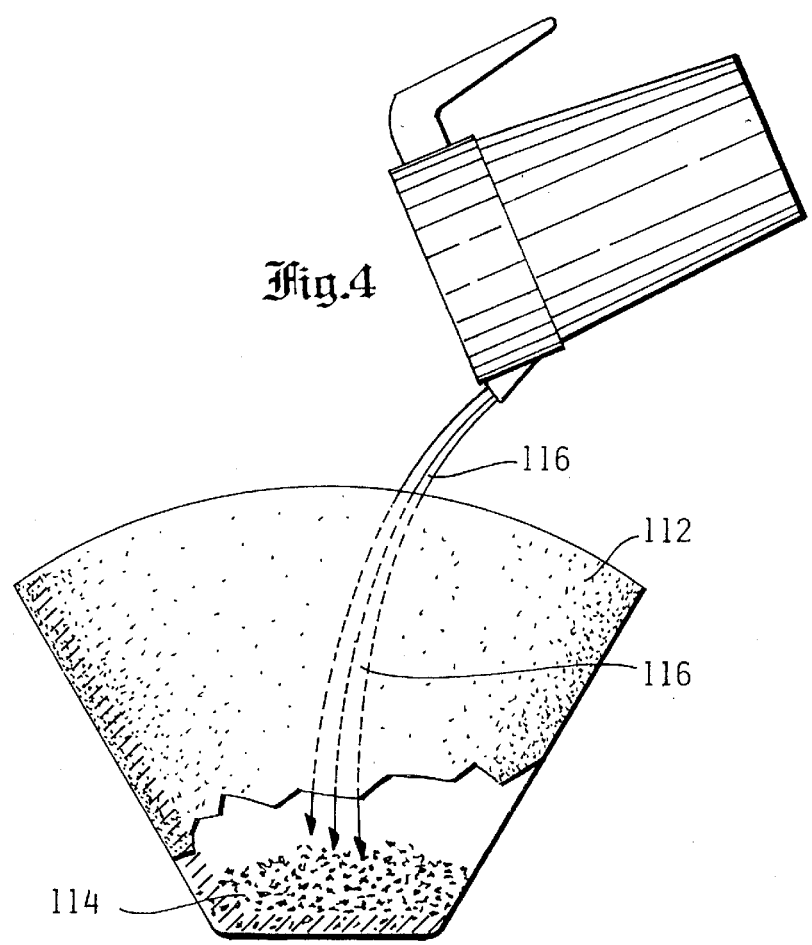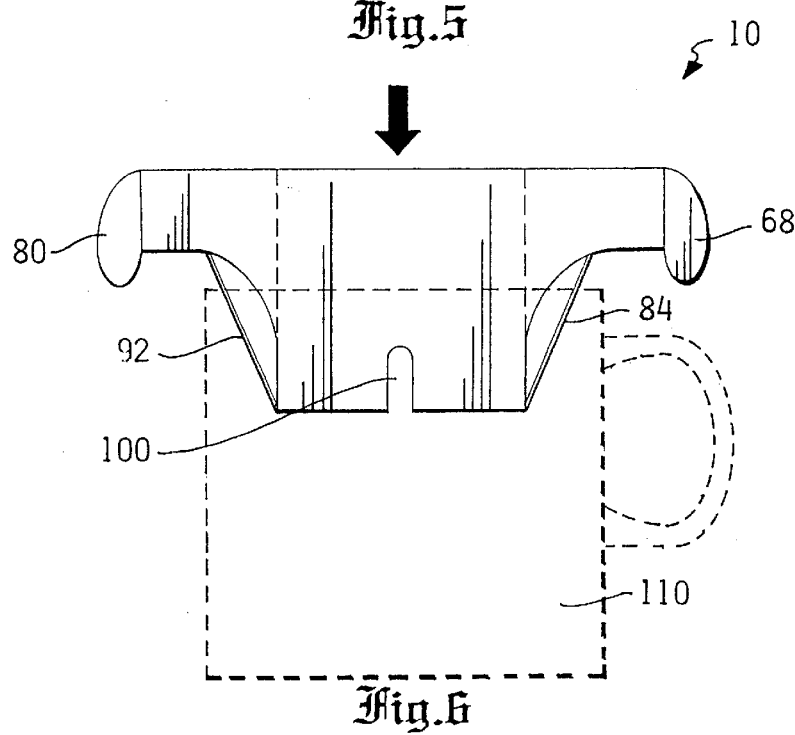

DISPOSABLE BEVERAGE MAKER

This application claims the benefit of U.S. Provisional Application No. 60/011,417, filed February 9, 1996.

TECHNICAL FIELD

This invention pertains to the general field of beverage makers such as coffee makers and more particularly to a disposable beverage maker which allows a single cup of a beverage to be made.

BACKGROUND ART

Normally when a cup of coffee is desired, there are only two ways by which this can be accomplished. First, an entire pot can be brewed, which will yield between five and eight cups of coffee. This manner proves very efficient, especially whenever there is more than one individual who will be sharing the coffee from the pot or when one single person desires more than one cup. Unfortunately, a large majority of people only consume one cup of coffee and are forced to dispose of the remainder that has been brewed. Even if someone chooses to have a second or third cup, there will still be between three and five cups left over, which will simply go to waste.

The second method commonly used to obtain a cup of coffee is to mix hot water with "instant" coffee. Instant coffee allows for as little or as much coffee to be made per an individual's desire. Although this method is extremely convenient, most coffee drinkers agree that the taste of instant coffee is not as favorable to that of brewed coffee. Therefore, a disposable beverage maker is needed which allows only a single cup or mug of a beverage, such as coffee or tea, to be brewed. The invention described herein provides such a beverage maker.

A search of the prior art did not disclose any patents that read directly on the claims of the instant invention however, the following U.S. Pat. Nos. were considered related:

| U.S. PAT. NO. | INVENTOR | ISSUED |
|---|---|---|
| 4,602,558 | Kapper, et al | 3 December 1984 |
| 4,602,557 | Yip | 13 July 1984 |

The 4,602,558, Rapper, et al patent discloses an apparatus for making at least one cup of coffee. The apparatus consists of a container for holding unground coffee, a metering station for metering a portion of unground coffee from the container, a compacting station and an extracting station and for transferring the metered portion to the compacting station from the metering station and form the compacting station to the extracting station. The apparatus also includes a means for compacting the portion at the compaction station including a punch for applying a pressure on the coffee of approximately 1,000 kg/cm² to break open the closed cells in the coffee. Means are also provided for transferring the compacted coffee at the extraction station to a hot water source for extraction to make a cup of coffee.

The 4,602,557, Yip patent discloses a liquid brewing cup having a closed bottom, a closed upraised sidewall that is secured to the bottom to define a central brewing liquid-receiving space. the upper end of the sidewall defining an open top rim, the rim includes a brew bag string-receiving and retaining notch to prevent inadvertent passage of the length of the string and the bag string tab connected thereto into the brewing liquid space during pouring, brewing, stirring and drinking of the liquid in the cup.

For background purposes and as indicative of the art to which the invention is related reference may be made to the remaining cited patents.

| U.S. PAT. NO. | INVENTOR | ISSUED |
|---|---|---|
| 5,415,475 | Sandy | 25 November 1992 |
| 4,997,015 | Johnson | 12 February 1990 |
| 4,642,190 | Zimmerman | 1 February 1985 |
| 4,303,525 | Stover | 14 September 1979 |

DISCLOSURE OF THE INVENTION

The disposable beverage maker is designed to allow an individual to conveniently and inexpensively make a single cup of a beverage such as coffee or tea. Although the beverage maker is primarily designed and dimensioned to make a single cup, it can also be produced in various other sizes to accommodate a mug, various sizes of plastic cups or a decanter, in which multiple cups may be made.

In its most basic design configuration, the disposable beverage maker utilizes a flat, insoluble material having:

a) a lower base having a first scored mark, a second scored mark, a third scored mark and a fourth scored mark, b) a first side wall extending outward from the first scored mark, c) a second side wall extending outward from the second scored mark, d) a first handle that extends outward from each side of the first side wall and a second handle that extends outward from each side of the second side wall, wherein the first and second handles each have outward sections, e) means for attaching the outward sections of the first and second handles, f) a first stabilizing flap that abuts the third scored mark and a second stabilizing flap that abuts the fourth scored mark, and g) an elongated slot located along the lower base.

When the outer sections of the first and second handles are attached and the first and second stabilizing flaps are folded upward, the beverage maker is configured to be placed, into a container. When placed into the container, the outward sections of the first and second handles extend over the lip perimeter of the container. Sequentially thereafter, a beverage filter is placed into the beverage maker, a quantity of beverage grounds are placed into the beverage filter, and hot water is poured into the filter. The hot water interacts with the beverage grounds which then causes the resulting beverage liquid to flow through the elongated slot and into the container. Note that the scored marks also function as channels which direct the flow of any accumulated water back into the container when the disposable coffee maker is lifted from the container.

The flat, insoluble material may be comprised of a 12-point or an 18-point cardboard, or a plastic material which are approved by the Federal Drug Administration (FDA). If a plastic material is used, the beverage maker can then be washed and reused. The means for attaching the outward sections of the first and second handles preferably consists of a slit located at each outward section of the handles. When the slits of the first handle is inserted into the corresponding slits on the second handle, the beverage maker is securely attached and configured for use. The outward section of the handles are rounded to allow them to be easily gripped and also to add to the aesthetics of the design.

In view of the above disclosure, it is the primary object of the invention to produce a disposable beverage maker that allows an individual to make a single cup of brewed coffee or similar beverages.

In addition to the primary object of the invention, it is also an object to produce a disposable beverage maker that:

o allows a beverage such as coffee or tea to be brewed in a cup,
o allows a beverage to be made to an individual's taste,
o allows a beverage to be made in seconds,
o allows fresh-brewed coffee to be make in small quantity,
o is convenient to use,
o eliminates waste which reduces cost,
o is hygienic,
o can be used indoors and outdoors; and
o is cost effective from both a manufacturers and consumers points of view.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 4 is an elevational side view of a pitcher that contains hot water that is being poured into a beverage filter.

FIG. 5 is a partial elevational and cutaway view of a typical cone-shaped coffee filter having coffee grounds and shown prior to being inserted into the disposable beverage maker.

FIG. 6 is an elevational view of a disposable beverage maker inserted into a coffee mug shown by broken lines.

REST MODE FOR CARRYING OUT THE INVENTION

Figure 1:
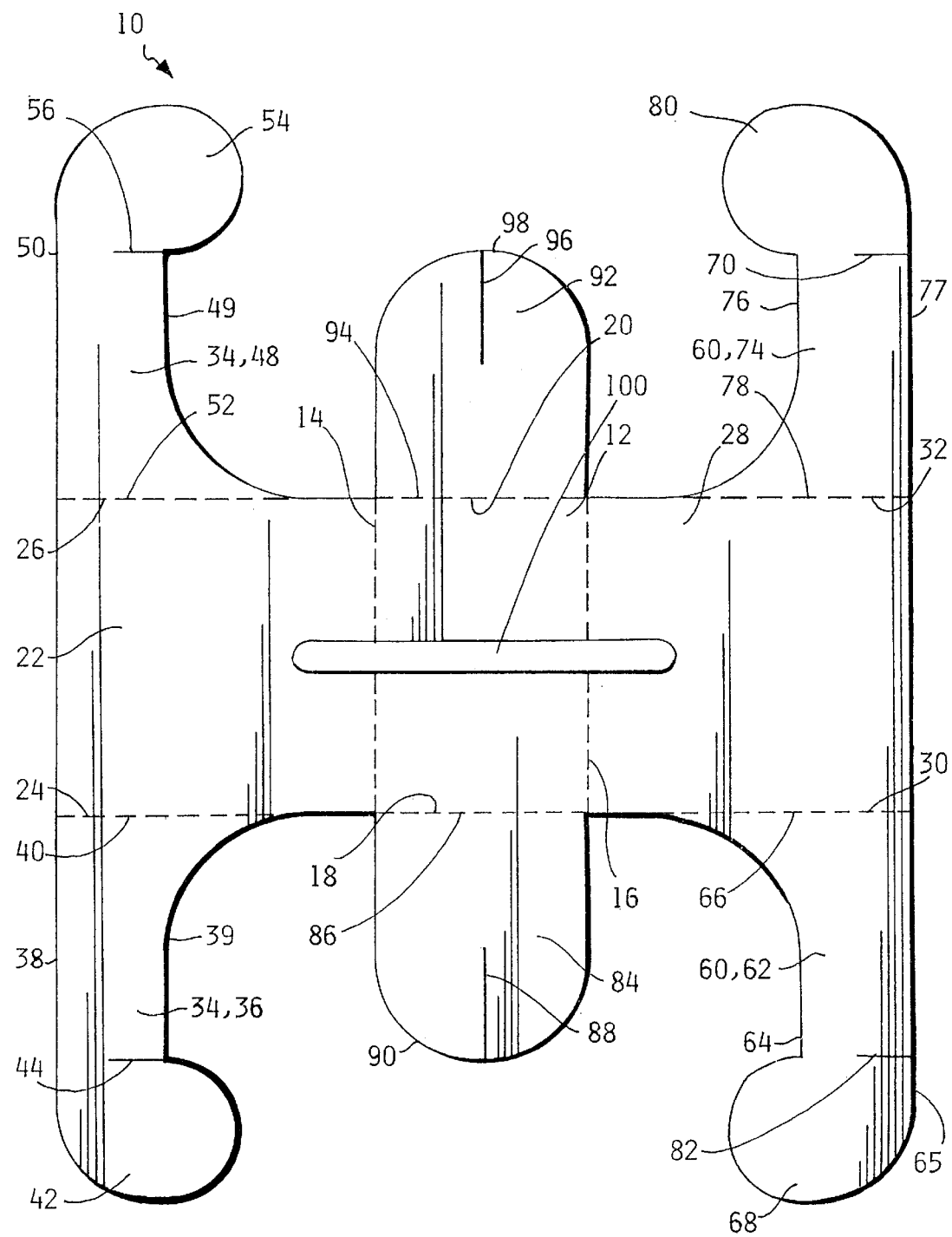
FIG. 1 is a top plan view of an unassembled disposable beverage maker.

The best mode for carrying out the invention is presented in terms of a preferred embodiment for a disposable beverage maker, which may be produced in various sizes. The preferred embodiment of the disposable beverage maker allows coffee, tea or other such brewed beverages to be made, one cup at a time, within the actual serving cup.

As shown in FIGS. 1–6, the disposable beverage maker 10, which can be constructed of a water insoluble material such as cardboard or plastic, with cardboard being preferred, is comprised of the following elements: a lower base 12; a first scored mark 14; a second scored mark 16; a third scored mark 18; a fourth scored mark 20; a first side wall 22 having a fifth scored mark 24 and a sixth scored mark 26; a second side wall 28 having a seventh scored mark 30 and an eighth scored mark 32; a first handle 34 which includes a first side 36 and a second side 48, the first side 36 includes an upper edge 38, an inner end 40, and a rounded outer section 42 having a first attachment slit 44, the second side 48 has an upper edge 50, an inner end 52, and a rounded outer section 54 which includes a second attachment slit 56; a second handle 60 which includes a third side 62 and a fourth side 74, the third side 62 includes a lower edge 64, an inner end 66, and a rounded outer section 68 having a third attachment slit 70, the fourth side 74 has a lower edge 76, an inner end 78, and a rounded outer section 80 which includes a fourth attachment slit 82; a first stabilizing flap 84 having an inner end 86, an outer rounded edge 90 having a slit 88; a second stabilizing flap 92 having an inner end 94 and an outer rounded edge 98 having a slit 96, and an elongated slot 100.

Further, there are four additional elements that, even though they are not a part of the invention per se, are required for implementing the invention. Due to this reason, those elements have been included for descriptive and illustrative purposes and are as follows: a container 110, a coffee filter 112; coffee grounds 114 and hot water 116.

In order to use the beverage maker 10, it must first be assembled. The assembly process consists of folding certain segments of the beverage maker 10 and inserting or sliding other segments into slits and slots.

As shown in FIG. 1 by maintaining the beverage maker 10 in a flat, non-assembled posture during shipping, displaying and storing before use, a substantial amount of space is saved while also providing a great deal of support for the un-used beverage makers 10. This ensures that every single beverage maker will be in perfect condition for its time of use.

The first action that is performed to assemble the beverage maker 10 is to fold the first side wall 22 in an upward direction at the first scored mark 14. The first side wall 22 should then form an approximate 90° angle with the lower base 12. Next, the second side wall 28, which is located on the opposing side of the first side wall 22, is folded upward at the second scored mark 16 in substantially the same manner as described for the first side wall. The two side walls 22,28, are now in upright positions, located substantially parallel to each other and separated along the first and second scored marks 14,16, between the lower base 12.

The next action consists of folding the first stabilizing flap 84 in an upward direction at the third scored mark 18. The upward folding action is then repeated by folding the second stabilizing flap 92 at the fourth scored mark 20. After both stabilizing flaps 84 and 92 are folded upwards the two rounded outer sections 42,68 are attached. This is accomplished by inserting the first attachment slit 44 into the third attachment slit 70. Once the two attachment slits 44,70 are attached, the first handle 34 is created. This action is then repeated with the second attachment 56 and the fourth attachment slit 82, thus creating the second handle 60. The next step is to push both of the handles 34,60 inward so that a fold is created at each of the fifth 24, sixth 26, seventh 28 and eighth 30 scored marks.

Figure 2:
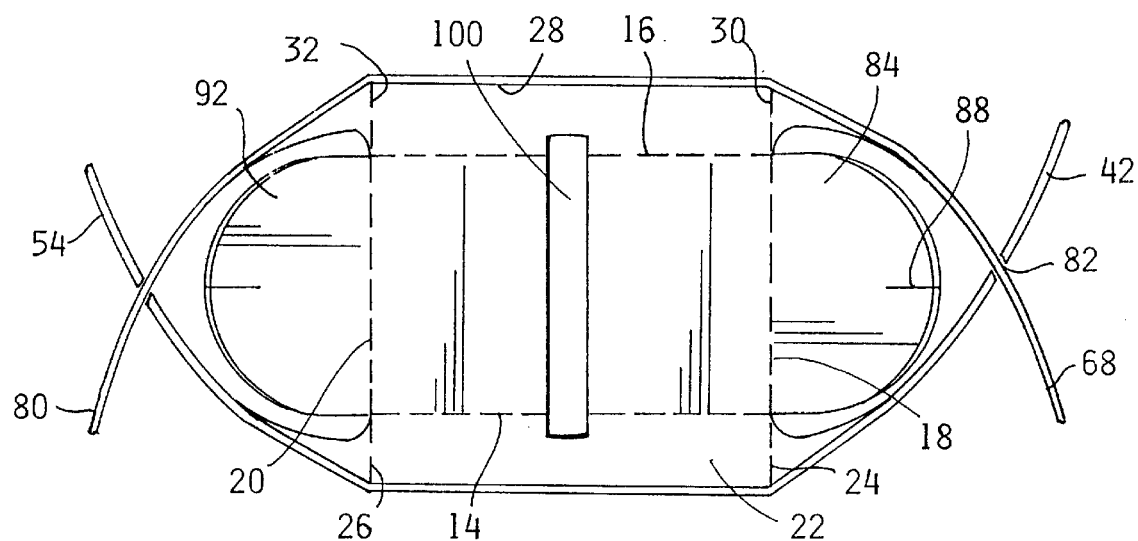
FIG. 2 is a top plan view of an assembled disposable beverage maker.
Figure 3:
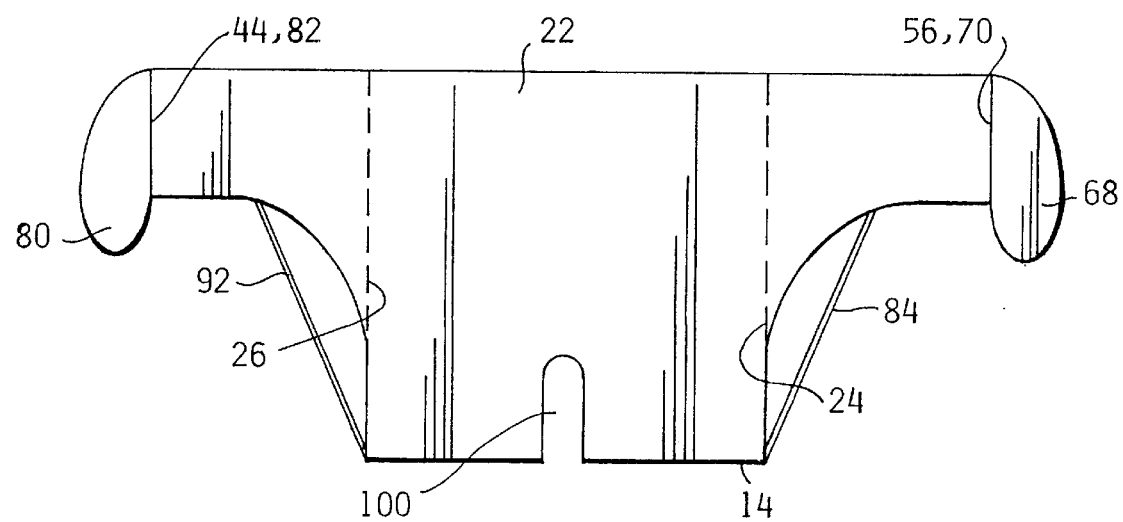
FIG. 3 is a side elevational view of an assembled disposable beverage maker.

The disposable beverage maker 10, as shown in FIGS. 2 and 3 is now ready to be used. An appropriately sized container 110, such as a cup or a coffee mug is placed on a level, sturdy surface. The beverage maker 10 is then inserted into the container 110. When inserted correctly, the beverage maker 10 is supported upon the container's 110 lip at two opposing sides by the two lower edges 39,64 of the first handle 34 and the opposite lower edges 49,76 of the second handle 60, as shown in FIG. 6. With the beverage maker 10 in place, it is then possible to place the coffee filter 112 into the beverage maker 10 as shown in FIG. 6. with the coffee filter 112 in place, a portion of coffee grounds 114 are inserted into the filter. Hot water 116 is then poured into the filter 112 and onto the grounds 114 as shown in FIGS. 4 and 5. In a short time, the hot water 116 interacts with the coffee grounds 14 and coffee is produced. This coffee then flows downward, through the elongated slot 100 and into the container 110. Once all of the coffee has entered the container, the beverage maker 10 is removed. As the beverage maker 10 is lifted from the container 110, any accumulated water is directed back into the container by the scored marks, which function as a fluid channel. The used beverage maker 10 is then disposed of.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

I claims:

1. A disposable beverage maker comprising a flat, insoluble, material having:
   a) a lower base having a first scored mark, a second scored mark, a third scored mark and a fourth scored mark,
   b) a first side wall extending outward from the first scared mark,
   c) a second side wall extending outward from the second scored mark,
   d) a first handle that extends outward from each side of said first side wall and a second handle that extends outward from each side of said second side wall, wherein said first and second handles each have outward sections,
   e) means for attaching the outward sections of said first and second handles,
   f) a first stabilizing flap that abuts the third scored mark and a second stabilizing flap that abuts the fourth scored mark, and
   g) an elongated slot located along said lower base, wherein when the outer sections of said first and second handles are attached and said first and second stabilizing flaps are folded upward, said beverage maker is configured to be placed into a container with the outward sections of said first and second handles extending over the lip of said container, whereupon sequentially a beverage filter is placed into said beverage maker, a quantity of beverage grounds are placed into said beverage filter, and hot water is poured into said filter causing the water to interact with the beverage grounds which then allows the resulting beverage liquid to pass through the elongated slot into the container.

2. The disposable beverage maker as specified in claim 1 wherein said beverage maker material is comprised of a thin foldable material.

3. The disposable beverage maker as specified in claim 1 wherein said means for attaching the outward edges of said first and second handles comprises a slit wherein when said slits are interconnected, said first and second handles are attached.

4. The disposable beverage maker as specified in claim 1 wherein said first and second stabilizing flaps further having a slit that extends inward from the a center of the outward end, wherein said slit aids in stabilizing said disposable beverage maker when it is inserted into said container.

5. A disposable beverage maker comprising a flat, insoluble material having:
   a) a lower base bordered by a first scored mark, a second scored mark, a third scored mark and a fourth scored mark,
   b) a first side wall extending outward from the first scored mark and having a fifth scored mark located normal to the first scored mark, a sixth scored mark located opposite the fifth scored mark and normal to the first scored mark,
   c) a second side wall extending outward from the second scored mark and having a seventh scored mark located normal to the second scored mark, an eighth scored mark located opposite the seventh scored mark and normal to the second scored mark,
   d) a first handle comprising:
      (1) a first side having an upper edge, a lower edge, an inner end that abuts the fifth scored mark and a rounded outer section having a first attachment slit that extends downward from the upper edge,
      (2) a second side having an upper edge, a lower edge, an inner end that abuts the sixth scored mark and a rounded outer section having a second attachment slit that extends downward from the upper edge,
   e) a second handle comprising:
      (1) a third side having a lower edge, an upper edge, an inner end that abuts the seventh cored mark and a rounded outer section having a third attachment slit that extends upward from the lower edge,
      (2) a fourth side having a lower edge, an upper edge, an inner end that abuts the eighth scored mark and a rounded outer section having a fourth attachment slit that extends upward from the lower edge,
   f) a first stabilizing flap having an inner end and an outer rounded edge, wherein the inner end is dimensioned to abut the third scored mark between the first and second scored marks,
   g) a second stabilizing flap having an inner end and an outer rounded edge, wherein the inner end is dimensioned to abut the fourth scored mark between the first and second scored marks, and
   h) an elongated slot longitudinally and centrally located along said lower base and along a portion of said first and second side walls, wherein when said first and second walls are folded inward, along the first and second scored marks, the first and second sides of said first handle are joined by interconnecting the first and second attachment slits, and the third and fourth sides of said second handle are joined by interconnecting the third and fourth attachment slits, said disposable beverage maker is configured to be placed into a container, with the outward sections of said first and second handles extending over the lip of said container, whereupon sequentially, a beverage filter is placed into said beverage maker, a quantity of beverage grounds are placed into said beverage filter, and hot water is poured into said filter causing the water to interact with the beverage grounds which then allows the resulting beverage liquid to pass through the elongated slot into the container.

6. The disposable beverage maker as specified in claim 5 wherein said beverage maker material is comprised of a thin foldable material.

7. The disposable beverage maker as specified in claim 6 wherein said material comprises a 12-point cardboard material that allows said beverage maker to be used at least one time.

8. The disposable beverage maker as specified in claim 6 wherein said material comprises an 18-point cardboard material that allows said beverage maker to be reused.

9. The disposable beverage maker as specified in claim 6 wherein said material comprises a thin plastic material that can be washed and reused.

10. The disposable beverage maker as specified in claim 5 wherein the outward section of the first and second sides of said first handle and the outward section of the third and fourth sides of said second handle have a rounded edge that aids in gripping said first and second handles.

11. The disposable beverage maker as specified in claim 5 wherein said first and second stabilizing flaps further having a slit that extends inward from the center of the outer end, wherein said slit aids in stabilizing said disposable beverage maker when it is inserted into said container.

12. The disposable beverage maker as specified in claim 5 wherein said beverage maker is dimensioned so that when interconnected said beverage maker fits into a coffee cup container.

13. The disposable beverage maker as specified in claim 5 wherein said beverage maker is dimensioned so that when interconnected said beverage maker fits into a coffee mug container.

14. The disposable beverage maker as specified in claim 5 wherein said beverage maker is dimensioned so that when interconnected said beverage maker fits into a decanter.

15. The disposable beverage maker as specified in claim 12 wherein said coffee filter is comprised of a cone-shaped number 1 coffee filter.

16. The disposable beverage maker as specified in claim 13 wherein said coffee filter is comprised of a cone-shaped number 2 coffee filter.

17. The disposable beverage maker as specified in claim 14 wherein said coffee filter is comprised of a cone-shaped number 4 coffee filter.

18. The disposable beverage maker as specified in claim 5 wherein said beverage comprises a coffee.

19. The disposable beverage maker as specified in claim 5 wherein said beverage comprises a tea.

* * * * *